(12) United States Patent
Gazzino et al.

(10) Patent No.: US 8,752,392 B2
(45) Date of Patent: Jun. 17, 2014

(54) DEVICE AND A METHOD FOR STARTING A TURBINE ENGINE FITTED TO A HELICOPTER, MAKING USE OF AN ELECTRICAL ENERGY SOURCE THAT INCLUDES DISCHARGE BOOSTER MEMBERS

(75) Inventors: Marc Gazzino, Marseilles (FR); Pierre Bertrand Lancelevee, Malissard (FR)

(73) Assignee: Airbus Helicopters, Marignane Cedex (FR)

( * ) Notice: Subject to any disclaimer, the term of this patent is extended or adjusted under 35 U.S.C. 154(b) by 802 days.

(21) Appl. No.: 12/816,608

(22) Filed: Jun. 16, 2010

(65) Prior Publication Data
US 2010/0319357 A1 Dec. 23, 2010

(30) Foreign Application Priority Data
Jun. 17, 2009 (FR) .................................. 09 02942

(51) Int. Cl.
*F02C 7/268* (2006.01)
(52) U.S. Cl.
USPC ........................................................... 60/787
(58) Field of Classification Search
USPC ................ 60/778, 786, 39.13; 244/53 A;
123/179.3; 320/104, 134, 778, 786, 320/39.13
See application file for complete search history.

(56) References Cited

U.S. PATENT DOCUMENTS

| | | | | |
|---|---|---|---|---|
| 2,962,859 A * | 12/1960 | Hodgson et al. | ................ | 60/788 |
| 4,754,730 A * | 7/1988 | Campagna | ................ | 123/179.3 |
| 5,850,113 A | 12/1998 | Weimer et al. | | |
| 6,035,626 A * | 3/2000 | Wahl et al. | ................ | 60/773 |
| 6,134,875 A * | 10/2000 | Massey | ................ | 60/788 |
| 6,321,707 B1 | 11/2001 | Dunn | | |
| 6,945,030 B2 * | 9/2005 | Hirayama et al. | ................ | 60/39.27 |
| 6,962,135 B2 * | 11/2005 | Kahlon et al. | ................ | 123/179.3 |
| 7,690,343 B2 * | 4/2010 | Doljack | ................ | 123/179.28 |
| 2004/0155527 A1 | 8/2004 | Bryde | | |
| 2008/0150356 A1 | 6/2008 | Breit et al. | | |
| 2008/0246443 A1 | 10/2008 | Doljack | | |

FOREIGN PATENT DOCUMENTS

FR 2914697 A1 10/2008

OTHER PUBLICATIONS

P. Barrade "Series connection of supercapacitors: Comparative study of solutions for the active equalization of the voltages", presented at the 7th Int. Conf. Model. Simul. Electr. Mach., Converters Syst. (Electrimacs), 2000 http://www.ee.bgu.ac.il/~pedesign/Graduate_problem_papers/Papers_2011/Super_cap_barrade_electrimacs_02.pdf.*

(Continued)

*Primary Examiner* — Phutthiwat Wongwian
*Assistant Examiner* — William Breazeal
(74) *Attorney, Agent, or Firm* — Brooks Kushman P.C.

(57) ABSTRACT

The invention provides a device and a method for starting at least one turbine engine (1) fitted to a helicopter. A starter (6) is fed with electrical energy from an electricity network (8) including at least one battery (9) and/or an electrical energy generator member. Discharge members (10) suitable for providing the starter (6) with a short-term boost of electrical energy in the form of a high-power pulse are incorporated in the network (8). The current pulse is delivered at a determined instant T starting from when the starter (6) is itself started, and/or from a determined threshold S for the speed and/or the variation in the speed with which the compressor (2) of the turbine engine (1) is driven, and/or from detecting D the ignition stage of the turbine engine (1), and/or from a manual control.

16 Claims, 2 Drawing Sheets

(56) References Cited

OTHER PUBLICATIONS

PilotOutlook http://www.pilotoutlook.com/helicopter_flying/electrical_systems Apr. 11, 2008 both pages.*

Search Report and Written Opinion; Application No. FR 09 02942; dated Mar. 10, 2010.

* cited by examiner

DEVICE AND A METHOD FOR STARTING A TURBINE ENGINE FITTED TO A HELICOPTER, MAKING USE OF AN ELECTRICAL ENERGY SOURCE THAT INCLUDES DISCHARGE BOOSTER MEMBERS

CROSS REFERENCE TO RELATED APPLICATION

This application claims the benefit of FR 09 02942 dated Jun. 17, 2009, the disclosure of which is incorporated herein by reference.

FIELD OF THE INVENTION

The present invention relates to the field of driving the rotors of a helicopter or of an analogous aircraft by means of a turbine engine, and more particularly it relates to starting such a turbine engine from a source of electrical energy. The invention provides a device and a method for achieving such starting.

BACKGROUND OF THE INVENTION

Helicopters and analogous aircraft are fitted with rotors that are driven in rotation by turbine engines associated therewith. In general terms, these turbine engines comprise a gas compressor, a fuel combustion chamber, and a turbine arranged in succession. The compressor generates air under pressure, which is then heated in the combustion chamber so as to drive the turbine in rotation. When the turbine engine is running on its own, the compressor is driven in rotation by the turbine. Turbine engines may be of the coupled turbine type, in which the turbine is coupled in rotation with the compressor by a working shaft, or of the free turbine type, with the compressor and the turbine being mounted on separate shafts. A problem arises concerning driving the turbine engine during starting until a drive threshold is reached at which the turbine is rotating sufficiently to enable the turbine engine to operate on its own.

It is known to fit the turbine engine with an auxiliary electric motor or "starter" in order to drive the compressor until said rotary drive threshold is reached for the turbine. The starter drives the compressor mechanically until a suitable compression threshold is reached at which fuel can be injected and the ignition circuit of the turbine engine can be operated. Thereafter, the starter continues to be operated until the turbine reaches a speed of rotation that is sufficient to allow the turbine engine to operate on its own. The starter is powered during starting by a source of electrical energy that is on board or that is external to the helicopter. For on-board electrical energy sources, they are generally constituted by an on-board battery and/or an electricity generator that serves to power the starter while it is starting the turbine engine.

A difficulty to be overcome lies in the need to deliver sufficient energy to the starter to drive the compressor against the opposing torque from the turbine. The torque delivered by the starter must remain greater than said opposing torque in order to achieve sufficient acceleration in the speed at which the compressor is driven, until the turbine engine starts operating on its own. The opposing torque from the turbine is particularly great at the beginning of starting the turbine engine, in particular prior to reaching said compression threshold suitable for injecting fuel and igniting the turbine engine. Once fuel is being injected and after the turbine engine has ignited, the starter and the turbine engine itself both act against the opposing torque so as to provide a force for driving the compressor, which force increases progressively until the turbine engine is operating on its own.

The mechanical torque that the starter is capable of delivering during starting needs to be adapted so as to drive the compressor until the turbine engine is operating on its own. Using on-board batteries for powering the starter cannot be satisfactory, particularly when they are used at so-called "extreme" temperatures or if the batteries are discharged. Batteries constitute a source of limited energy while nevertheless presenting a weight that is large. The batteries are also used for powering other members of the helicopter, which means are used both on the ground prior to and during starting of the turbine engine, and also while in flight. Batteries need to satisfy requirements for operating at low temperatures, in particular because batteries are weaker at low temperatures while the opposing torque from the turbine against setting the compressor into rotation increases at low temperatures. Consequently, it is necessary for on-board batteries to have a comfortable reserve of energy, with the consequent drawback of increasing their weight, and their size, and thus increasing the load that needs to be carried by the helicopter.

Mention is made of document US 2008/0246443 (Doljack), which describes a device for improving an operating stage that generates an electricity consumption peak either in a self-propelled terrestrial vehicle (FIG. 1A), or in a portable electronic appliance (FIGS. 1C-E). That device makes provision, permanently in its circuit (100), for a module (105) of supercapacitors connected in series (120) relative to a charger (110) or a battery (115). For a terrestrial vehicle (100), the voltage appears to be 12 volts (V), and for portable appliances it appears to be 5 V (§0038). The voltage of the module (105) is independent of that of the battery (115).

Document U.S. Pat. No. 6,321,707 (Dunn) describes a direct current (DC) system for starting vehicle engines. The battery voltage of the vehicle is 12 V. An auxiliary energy storage device is installed in the vehicle in optionally-removable manner.

SUMMARY OF THE INVENTION

One object of the present invention is to propose a device and a method for starting a turbine engine fitted to a helicopter until it can operate on its own. The present invention seeks more particularly to propose such a method and device that provide solutions for overcoming the problems and the difficulties mentioned above and for avoiding the drawbacks that stem therefrom. The invention is defined by the claims.

In an embodiment, the device of the present invention is organized to start at least one turbine engine fitted to a helicopter. The device comprises a starter that is associated with the turbine engine, in the form of an electric motor. The starter is powered electrically from an electricity network that is on board the helicopter and that includes at least one source of electrical energy having at least one battery and/or electrical energy generator member. Such an electricity generator member is a member on board the helicopter and may be constituted by an electricity generator power member or by any other analogous apparatus suitable for generating electrical energy, such as an electromagnetic generator making use of the rotor brake of the helicopter, for example. The electricity network is also suitable for being associated with a circuit for operating the starter, or indeed with members for measuring and monitoring the operation thereof.

According to a characteristic, such a device is recognizable mainly in that the source of electrical energy additionally includes discharge members that are suitable for providing the starter with a short-term boost of electrical energy in the form of a high-power pulse. The discharge members are in particular supercapacitors, which are themselves known, and they are arranged to provide power density and energy density intermediate between a battery and conventional electrolytic capacitors. Supercapacitors are electrical components capable of storing a large quantity of energy in a small volume and capable of delivering that energy over a short period, of the order of a few seconds.

The boost delivered by the discharge members to the starter power supply network enables the starter to receive sufficient power to drive the turbine towards the threshold at which the turbine engine begins to operate on its own. More particularly, the quantity of energy needed by the starter varies as starting of the turbine engine progresses, and in particular as a function of the magnitude of the opposing torque delivered by the turbine, which magnitude varies. The invention serves advantageously to deliver a large amount of power over a short duration at a given instant in order to enable the starter to overcome the opposing torque when it is at its greatest. This instant corresponds in particular to the turbine engine transitioning to its ignition stage. Energy is advantageously taken from the discharge members under the dependency of monitoring means that are suitable for determining the appropriate instant for taking said energy. Such monitoring means are associated in particular with means for measuring one or more parameters indicative of the magnitude of the opposing torque from the turbine against drive of the compressor by the starter.

The energy reserve that is provided by the batteries for starting the turbine engine can then be smaller, thereby making it possible to reduce the weight and the size of the on-board batteries.

The delivery of a current pulse to feed energy to the starter may also be advantageous when starting under difficult climatic conditions, in particular at low temperatures. Low temperatures are detrimental to good operation of batteries on board the helicopter and/or make the compressor of the turbine engine more difficult to drive because of an increase in the opposing torque developed by the turbine. The use of discharge members for powering the starter enables the weakness of the batteries to be overcome and gives the starter sufficient energy to overcome the particularly high opposing torque that is developed by the turbine at low temperatures.

In the event of a loss of engine power, and in particular in the event of losing the electricity resource provided by the on-board batteries and/or an electricity generator, a boost of electrical energy reserved for starting the turbine engine can be necessary. The discharge members, which are preferably excluded from electrically powering other members on board the helicopter, may be used to drive the compressor of the turbine engine, being reserved for starting it. The discharge members may also be used for filtering the on-board network.

As an indication, the combined capacitance of the discharge members is suitable for providing an electrical energy boost in the form of a current of the order of several hundreds to several thousands of amps. The discharge members are advantageously grouped together as a plurality of members in at least one module. By way of example, the discharge members present a unit voltage of about 2.7 Vdc and are connected to one another in series in each module, with the number of members in a module being selected so as to be suitable for use on an electricity network having a voltage lying in the range 24 Vdc to 29 Vdc. The individual capacitance of the discharge members lies in the range several tens to several thousands of farads. More particularly, the discharge members are grouped together by the dozen in at least one module, with each discharge member in a module having an individual capacitance of the order of 3000 farads (F).

More precisely, in a preferred, but non-limiting embodiment, the discharge members are grouped together as a plurality of members in at least one module. The discharge members of a module are preferably grouped together by the dozen, with an individual capacitance of about 3000 F for a unit voltage of about 2.7 Vdc, and they are connected in series, thereby making the module suitable for use on a network operating at a voltage of about 28 Vdc, and in particular lying in the range 24 Vdc to 29 Vdc.

In an advantageous embodiment, the discharge members, and in particular at least one module, form at least in part an accessory that is removably mounted in the network. It should be understood that the term "accessory" is used to mean that it is possible to install or not install a group of discharge members in the network without interfering with the electrical continuity of the network that is required for it to operate, with it being possible in particular to remove a module without interrupting the network. Such an accessory may be used optionally depending on requirements, being installed on board the helicopter when necessary, e.g. when temperatures are low. When the accessory is not essential, it may be removed from the network without affecting its operation, thereby avoiding having a pointless load on board the helicopter.

The discharge members are mounted in the network either in series or in parallel relative to the battery and/or the electrical energy generator member. A series connection nevertheless has the advantage of enabling the discharge members to be used optimally in the event of battery failure.

Activation of the discharge members for delivering said electrical energy boost is made to depend in particular on measurement means that may equally well be of the time-measuring type and/or of the dynamic type for detecting the drive speed of a compressor of the turbine engine and/or of the electrical type for detecting the ignition stage of the turbine engine and/or of the type for detecting climatic conditions. These preferred examples of arrangement for the measurement and/or monitoring means are not limiting.

More particularly, the activation of the discharge members may depend on various means for monitoring variation in the drive of the compressor while the turbine engine is being started. These monitoring means may make use of any information relating to the operation of the starter, to the drive of the compressor, and/or to the opposing torque developed by the turbine, or indeed any other information representative of the energy requirements of the starter for driving the compressor while starting the turbine engine.

Activation of the discharge members for delivering said electrical energy boost is advantageously made to depend on a control circuit for operating the starter. This activation may take place at a given length of time after the starter is itself started. As an indication, the period between starting the starter and discharging the discharge members may be of the order of a few seconds, e.g. lying in the range 3 seconds (s) to 5 s, and more particularly of the order of 4 s. It should be observed that it is appropriate to leave a certain amount of time for charging the discharge members when it is desired to make use of them immediately after they have recharged. Under such circumstances, a period of the order of about one hundred seconds after first starting the starter should be allowed for recharging purposes. It should be understood that these time values are given purely by way of indication and need to be matched to particular circumstances, such as the type of turbine engine used and depending on the power of the turbine engine used.

The activation of the discharge members may also take place on detecting stagnation in the drive speed of the compressor while starting the turbine engine. The electrical power delivered to the compressor then needs to be adjusted in magnitude and in duration as a function of parameters that are measured in real time and that relate to driving the compressor. Such arrangements make it possible to restrict the energy boost pulse that is delivered by the discharge members to the minimum that is strictly required.

Preferably, the activation of the discharge members for delivering said electrical energy boost is also made to depend on a manual control member. These arrangements are intended, where appropriate, to allow the helicopter pilot to choose the instant at which it is appropriate to make use of the discharge members. Such a choice is made selectively available to the pilot e.g. in the event of losing engine power, and/or in the event of the electricity resources of the helicopter being degraded or failing.

The discharge members in particular are mounted in the network, being suitable for being recharged with energy from the battery and/or from the electrical energy generator member and/or from equipment external to the network for delivering electrical energy.

In general, the discharge members may be recharged from any energy source, be it an on-board source or an external source. More particularly, the energy resources on board the helicopter may be used. It is also possible to make use of an energy source external to the helicopter, such as an electrical power supply from a network on the ground or from a movable independent energy source. It should be observed that the discharge members should preferably be recharged with energy extemporaneously when they are used, or in other words shortly before they are used.

Preferably, the network includes a DC/DC converter for regulating the current delivered by the discharge members and/or the current used for recharging them. In particular, the converter serves to regulate current and voltage so as to preserve the discharge members from surges, and so as to recharge the discharge members quickly and correctly using constant current and voltage. The converter also serves to control the amount of electricity used for charging purposes in order to avoid disturbing the voltage of the electricity network on board the helicopter while in flight. The converter also makes it possible to control the amount of electricity needed for starting as a function of the desired starting time, so as to deliver no more than the power actually required.

The present invention also provides a method of starting a turbine engine fitted to a helicopter by implementing a device as described above. According to a characteristic, the method consists in feeding energy to the starter by delivering a high-power current pulse by means of discharge members, constituted in particular by supercapacitors, to boost moderate current delivery by means of the battery and/or the current generator member.

By way of example, the current pulse is delivered, in isolation or in combination, on the basis of various monitoring and control operations:

at a determined instant T measured from starting the starter;
from a determined threshold S for the drive speed and/or the variation in said drive speed of the compressor of the turbine engine, in particular on detecting stagnation of the drive speed of the compressor;
on detecting D the ignition stage of the turbine engine; and
on the basis of a manual control.

Extemporaneous recharging of the discharge members may be performed from an energy source on board the helicopter and/or from a source that is external to the network.

The starter energy feed network is in particular provided with an optional booster source that is removable without affecting the operation of the network that is formed by at least one module grouping together a plurality of said discharge members.

BRIEF DESCRIPTION OF THE DRAWINGS

The present invention can be better understood on reading the following description of embodiments given with reference to the figures of the accompanying sheets, in which.

DETAILED DESCRIPTION OF THE PREFERRED EMBODIMENTS

Figure 1:
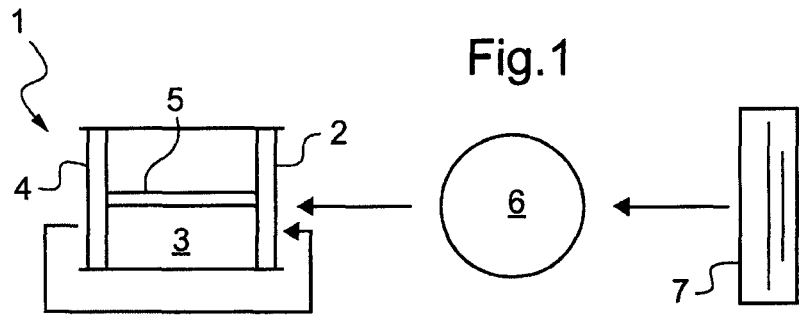
FIG. 1 is a diagram showing the principle of how a turbine engine is started.

In FIG. 1, a turbine engine 1 comprises a gas compressor 2 for increasing the pressure of the air that is contained in a combustion chamber 3. The air is put under pressure by centrifuging. Once the turbine engine 1 has started, the air under pressure is heated in the combustion chamber 3 so as to cause it to expand and drive a turbine 4 in rotation. The turbine 4 is coupled to drive the compressor 2 by a drive shaft 5, such that rotation of the turbine drives the compressor 2. In order to simplify the description of the present invention, it is applied to the embodiment shown in FIG. 1 of a turbine engine of the type having a coupled turbine. Nevertheless, it should be understood that this application is not restrictive, and that the present invention is preferably applicable to a turbine engine of the type having a free turbine and/or of the type having a turbocharger. While starting it is necessary to drive the compressor 2 by means of an auxiliary member, until the turbine engine 1 can operate on its own. This auxiliary member is constituted by a starter 6, such as an electric motor, that is electrically powered from a source 7 of electrical energy. When applied to starting a turbine engine 1 for driving a helicopter rotor, this source 7 of electrical energy is constituted in particular by a source on the ground or by an on-board source, such as batteries, or by an electricity generator, for example.

Figure 2:
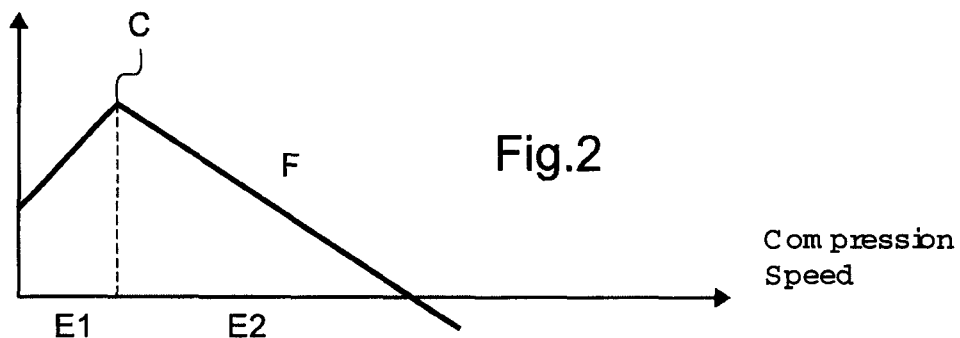
FIG. 2 is a graph showing how the opposing torque developed by the turbine engines varies as a function of drive speed while starting.

In FIG. 2, the graph shows how opposing torque F varies as a function of the speed at which the compressor is driven during starting. This opposing force is developed in particular by the turbine 4 against the compressor 2 being driven in rotation by the starter 6. Overall, the starting stage for a turbine engine is subdivided into two sub-stages. During a first sub-stage E1, the starter 6 drives the compressor 2 mechanically until it reaches a compression threshold suitable for injecting fuel into the combustion chamber 3 and for operating an ignition circuit of the turbine engine 1. The operation of the starter 6 is then maintained during a second sub-stage E2 until the turbine 4 has reached a speed of rotation that is sufficient to enable the turbine engine 1 to operate on its own. The optimum opposing torque C against the compressor 2 being driven by the starter 6 is exerted at the end of the first sub-stage, when said compression threshold is about to be reached. The turbine 4 develops opposing torque against the drive of the compressor 2 that is at an optimum when the turbine engine 1 begins to operate on its own, and the turbine 4 begins to be driven by hot air under pressure.

Figure 3:
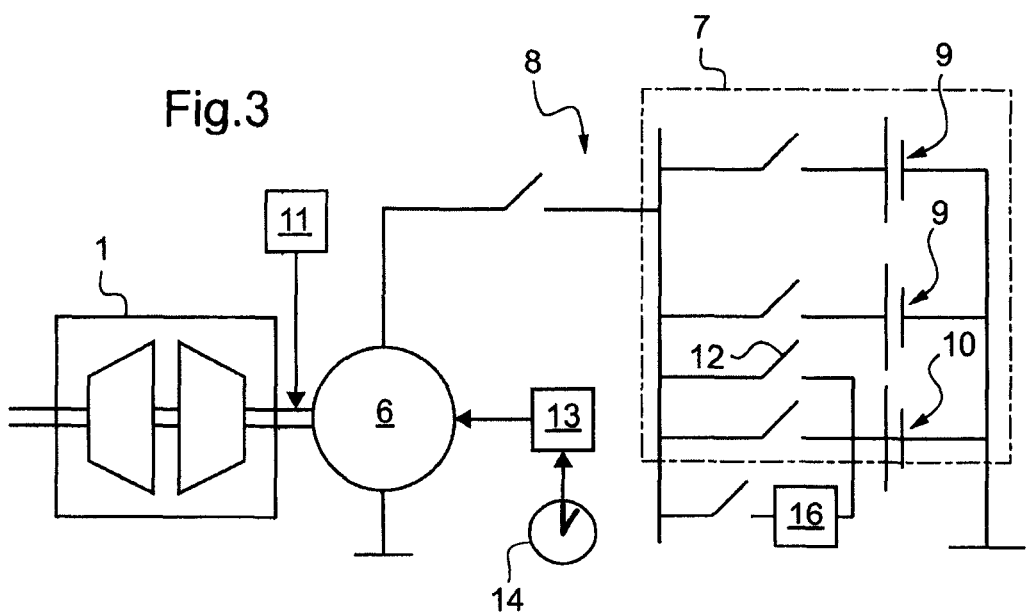
FIG. 3 is a diagram of a device of the present invention.
Figures 4, 5:
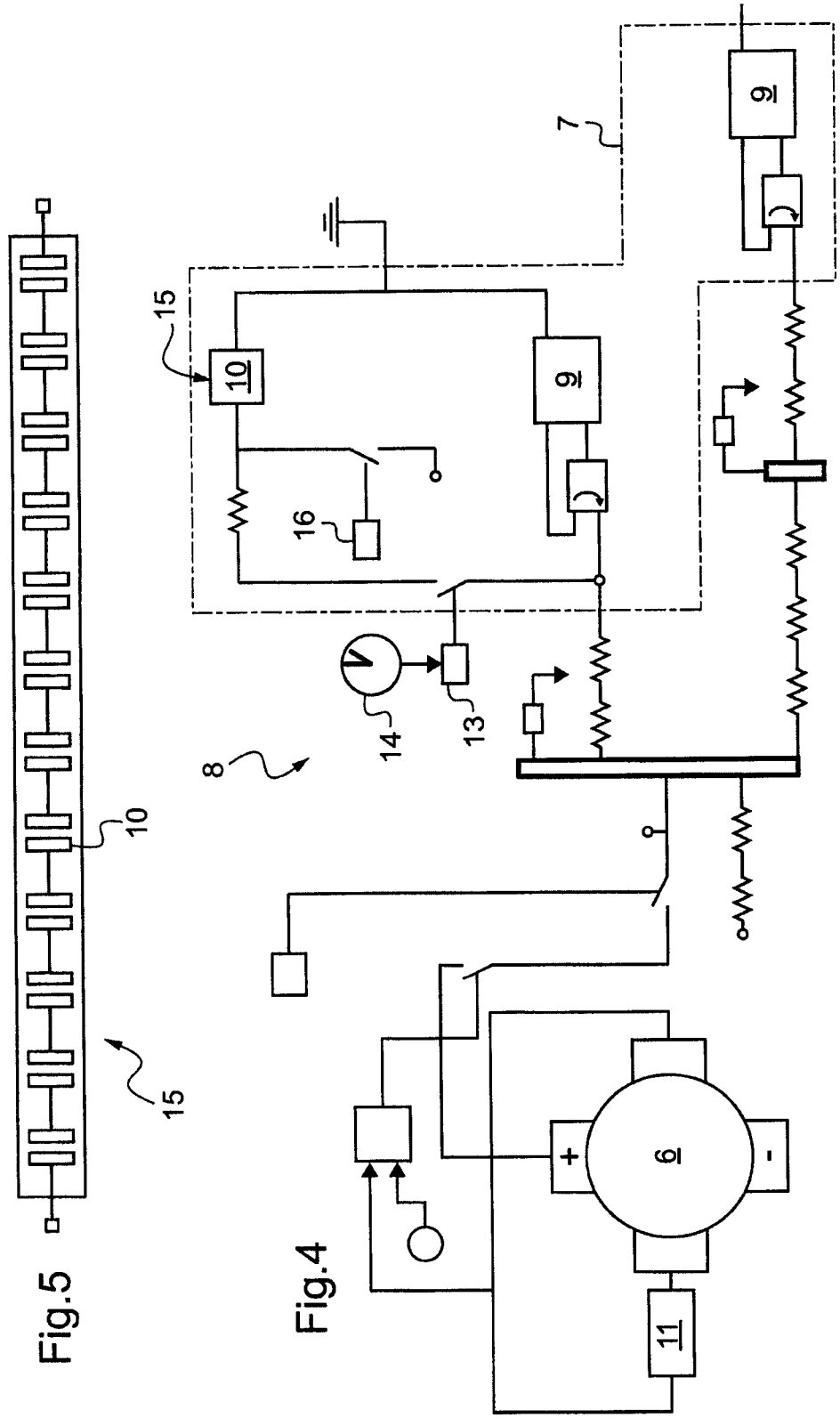
FIG. 4 is a circuit diagram of an embodiment of a device of the present invention.
FIG. 5 is a diagram showing an embodiment of a discharge member module included in a device of the present invention.

In FIGS. 3 and 4, the starter 6 is connected to a network 8 in order to receive electrical power. The network 8 includes the source 7 of electrical energy, including batteries 9 in the example shown. During the stage of starting the turbine engine 1, the invention proposes delivering a short-term boost of electrical energy in the form of a high-power pulse to the starter 6. This boost is delivered by discharge members 10, in particular supercapacitors, that are incorporated in the electrical power supply network for the starter 6. This short-term energy boost is preferably implemented when the torque opposing drive of the compressor 2 is at its optimum, so as to deliver high power to the starter 6, thereby enabling it to overcome the optimum opposing torque while preserving the batteries 9 from being exhausted. These arrangements make it possible to restrict the amount of energy that the batteries 9 need to supply, and thus to limit their weight and size, and consequently to limit the load that needs to be carried on board the helicopter. Furthermore, in the event of engine difficulties as a result of the batteries or the on-board electricity generator member being spoilt or degraded, the discharge members 10 may be used to enable the turbine engine 1 to start.

In the embodiment shown, the discharge members 10 are preferably connected in parallel with the batteries 9. This makes it possible to use them, even when at least one of the batteries 9 has deteriorated. Nevertheless, such a preferred solution does not exclude the possibility of connecting the discharge members 10 in series with the batteries 9.

Activation of the discharge members 10 is made to depend on measurement and monitoring means 11. In the embodiment shown, these measurement and monitoring means are constituted by dynamic type means suitable for measuring and monitoring the speed at which the compressor is driven. When the compressor drive speed is detected as substantially stagnating, i.e. when there is a decrease in the acceleration of the drive of the compressor 2, the discharge members 10 are used to increase the power delivered by the starter 6. Preferably, a manual control member 12 also allows the discharge members 10 to be discharged should the pilot so desire. Activation of the discharge members 10 may also be made to depend on a control circuit 13 for operating the starter 6 and associated with timer means 14. Such arrangements enable the discharge members 10 to be activated after a predetermined duration has elapsed since starting the starter 6. This duration corresponds to a setpoint period that should elapse between the moment the starter itself is started and the time at which the optimum opposing torque is generated. Such a setpoint period may be considered to be constant for a given starter and turbine engine, and it may be weighted as a function of measured ambient temperature.

The discharge members 10 are themselves recharged by means of the batteries 9, via a DC/DC converter 16. Such a converter is suitable for regulating the current used for recharging the discharge members 10 or the current delivered thereby.

In FIG. 5, a removable module 15 is organized to constitute an accessory that is suitable for being installed selectively in an electrical power supply network 8 of a starter 6 used for starting a turbine engine 1. This module 15 is for use when climatic conditions are unfavorable for reliable use of the batteries 9, such as when temperatures are low. Such a module 15 may be installed in the network 8 in optional manner so as to avoid the helicopter carrying an additional on-board load. The module 15 is constituted for example a dozen discharge members 10 that are connected in series, each having a unit voltage of about 2.7 Vdc and a capacitance of about 3000 F.

What is claimed is:

1. A device for starting a turbine engine fitted to a helicopter, the turbine engine having a compressor and a turbine, wherein the turbine engine becomes started when the compressor is driven to have a sufficient speed and the turbine generates an opposing torque which varies as a function of the speed of the compressor against the compressor being driven, the device comprising:

a starter; and an electricity network including at least one source of electrical energy including at least one battery and/or an electrical energy generator member configured to power the starter with electrical energy in order for the starter to drive the compressor of the turbine engine during starting of the turbine engine;

the source of electrical energy further including capacitors configured to provide the starter with an electrical energy boost in the form of a pulse to boost the electrical energy powering the starter from the battery and/or the generator member during the starting of the turbine engine;

wherein a plurality of the capacitors are grouped together in at least one module;

wherein, after the compressor has been initially driven by the starter with electrical energy from the battery and/or the generator member such that the speed of the compressor is increased toward the sufficient speed to a value corresponding to the opposing torque reaching a torque threshold, a controller for the starter is configured so the capacitors provide the starter with the electrical energy boost while the opposing torque is greater than the torque threshold such that the capacitors and the battery and/or the generator member and provide the starter with electrical energy while the opposing torque is greater than the torque threshold and the battery and/or the generator member provide the starter with electrical energy while the opposing torque is less than the torque threshold.

2. A device according to claim 1, wherein the capacitors are mounted in the network either in series or in parallel relative to the battery and/or the electrical energy generator member.

3. A device according to claim 1, wherein activation of the capacitors for delivering said electrical energy boost is made to depend on a monitor that may equally well be of the time-measuring type and/or of the dynamic type for detecting the drive speed of the compressor of the turbine engine being indicative of the opposing torque being greater than the torque threshold and/or of the electrical type for detecting the ignition stage of the turbine engine which is indicative of the opposing torque being at a maximum value greater than the torque threshold.

4. A device according to claim 1, wherein the activation of the capacitors for delivering said electrical energy boost is made to further depend on a manual control member.

5. A device according to claim 1, wherein the capacitors are mounted in the network, being suitable for being recharged with energy from the battery and/or from the electrical energy generator member and/or from equipment external to the network for delivering electrical energy.

6. A device according to claim 5, wherein the network includes a DC/DC converter for regulating the current delivered by the capacitors and/or the current used for recharging them.

7. A method of starting a turbine engine fitted to a helicopter, the turbine engine having a compressor and a turbine, wherein the turbine engine becomes started when the compressor is driven to have a sufficient speed and the turbine generates an opposing torque which varies as a function of the speed of the compressor against the compressor being driven, the method comprising:
    powering a starter, associated with the turbine engine, with electrical energy from at least one battery and/or an electrical energy generator member of an electricity network in order for the starter to drive the compressor of the turbine engine during starting of the turbine engine; and
    feeding to the starter an electrical energy boost in the form of a pulse from capacitors of the electricity network to boost the electrical energy powering the starter from the battery and/or the generator member during the starting of the turbine engine, wherein a plurality of the capacitors are grouped together in at least one module,
    wherein after initially driving the compressor by the starter with electrical energy from the battery and/or the generator member such that the speed of the compressor is increased toward the sufficient speed to a value corresponding to the opposing torque reaching a torque threshold, providing from the capacitors to the starter the electrical energy boost while the opposing torque generated by the turbine is greater than the torque threshold such that the capacitors and either the battery and/or the generator member provide the starter with electrical energy while the opposing torque is greater than the torque threshold and the battery and/or the generator member provide the starter with electrical energy while the opposing torque is less than the torque threshold.

8. A method according to claim 7, wherein the energy boost is delivered at an instant T determined from when the starter was itself started while the opposing torque is greater than the torque threshold, and/or from a determined threshold S for the speed being indicative of the opposing torque being greater than the torque threshold and/or the speed stagnating with which the compressor of the turbine engine is driven which occurs when the opposing torque is greater than the torque threshold and greater than energy driving the compressor, and/or from detecting D the ignition stage of the turbine engine which is indicative of the opposing torque being at a maximum value greater than the torque threshold.

9. A method according to claim 7, further comprising extemporaneously recharging the capacitors from an energy source on board the helicopter and/or from a source that is external to the network.

10. A device according to claim 1, wherein the capacitors are supercapacitors.

11. A device according to claim 1, further comprising a monitor configured to detect when the turbine engine transitions to an ignition stage which corresponds to when the opposing torque is at a maximum value greater than the torque threshold, wherein the capacitors are activated to provide the starter with the electrical energy boost when the monitor detects the turbine engine transitioning to the ignition stage.

12. A device according to claim 1, further comprising a monitor configured to detect drive speed of the compressor of the turbine engine, wherein the capacitors are activated to provide the starter with the electrical energy boost when the monitor detects the drive speed as stagnating which occurs when the opposing torque is greater than the torque threshold and greater than energy driving the compressor.

13. A method according to claim 7, wherein the capacitors are supercapacitors.

14. A method according to claim 7, wherein feeding to the starter the electrical energy boost from the capacitors occurs upon the turbine engine transitioning to an ignition stage which corresponds to when the opposing torque is at a maximum value greater than the torque threshold.

15. A method according to claim 7, wherein feeding to the starter the electrical energy boost from the capacitors occurs upon drive speed of the compressor of the turbine engine stagnating which occurs when the opposing torque is greater than the torque threshold and greater than energy driving the compressor.

16. A device for starting a turbine engine fitted to a helicopter, the turbine engine having a compressor and a turbine, wherein the turbine engine becomes started when the compressor is driven to have a speed reaching a rotary drive threshold and the turbine generates an opposing torque which varies as a function of the speed of the compressor against the compressor being driven until the turbine engine is started, wherein the opposing torque is at a maximum when the speed of the compressor is at a compression threshold between zero speed and the rotary drive threshold, the device comprising:
    a starter; and
    an electricity network including a source of electrical energy including a battery and/or a generator configured to power the starter with electrical energy in order for the starter to drive the compressor during starting of the turbine engine;
    the source of electrical energy further including capacitors configured to provide the starter with an electrical energy boost in the form of a pulse to boost the electrical energy powering the starter from the battery and/or the generator during the starting of the turbine engine;
    wherein a plurality of the capacitors are grouped together in at least one module;
    wherein, after the compressor has been initially driven by the starter with electrical energy from the battery and/or the generator member such that the speed of the compressor is increased from the zero speed toward the compression threshold, a controller for the starter is configured so the capacitors provide the starter with the electrical energy boost while the speed of the compressor is within a speed range of the compression threshold corresponding to the opposing torque being within a torque range of the maximum opposing torque such that the capacitors and either the battery and/or the generator provide the starter with electrical energy while the speed of the compressor is within the speed range of the compression threshold, and the battery and/or the generator provide the starter with electrical energy while the speed of the compressor is outside of the speed range of the compression threshold, and none of the battery and/or the generator and the capacitors provide the starter with any electrical energy when the speed of the compressor reaches the rotary drive threshold.

* * * * *